United States Patent [19]

Hancock

[11] Patent Number: 4,488,090
[45] Date of Patent: Dec. 11, 1984

[54] ADVERTISING SIGN SYSTEM

[75] Inventor: Bruce J. Hancock, Mesa, Ariz.

[73] Assignee: Jack Hodson, Glendale, Ariz.

[21] Appl. No.: 415,743

[22] Filed: Sep. 7, 1982

[51] Int. Cl.$^3$ .......................................... H05B 37/00
[52] U.S. Cl. .................................... 315/201; 315/220; 315/277; 307/17; 307/157
[58] Field of Search ............... 315/186, 201, 210, 219, 315/220, 255, 277, DIG. 7; 362/812; 307/11, 17, 42, 157; 40/545

[56] References Cited

U.S. PATENT DOCUMENTS

| | | | |
|---|---|---|---|
| 1,654,350 | 12/1927 | Shelton | 315/220 X |
| 3,862,411 | 1/1975 | Persson | 315/277 X |
| 4,149,113 | 4/1979 | Sammis | 315/219 |

*Primary Examiner*—David K. Moore
*Attorney, Agent, or Firm*—LaValle D. Ptak

[57] ABSTRACT

A low-voltage system is disclosed for supplying operating power to high-voltage neon light tubes located within housings in the forms of letters and other shapes commonly used for illuminated advertising on the outside of buildings. Within the building, a first step-down transformer is connected to the conventional household power supply of 110 volt 60 Hz current. The step-down transformer produces a low-voltage signal in the range of 16 to 24 volts at the 60 Hz operating frequency. The low-voltage wires are passed through the exterior wall of the building on which the advertising sign housing is mounted and require no special precautions or high-voltage insulation due to the extremely low voltage involved. Within each high-voltage lamp housing, a solid state low-voltage to high-voltage conversion circuit is mounted. The input to this circuit comprises the 16 to 24 volt 60 Hz low-voltage current. This signal is supplied to a full-wave rectifier, which supplies operating power to a high-frequency oscillator (10,000 Hz to 30,000 Hz), the output of which, in turn, is used to drive a power switching transistor connected to the primary winding of a step-up transformer. This high-frequency signal, as obtained from the secondary winding of the step-up transformer, is used to supply a high-voltage operating alternating current to the neon tube mounted within the sign housing.

13 Claims, 6 Drawing Figures

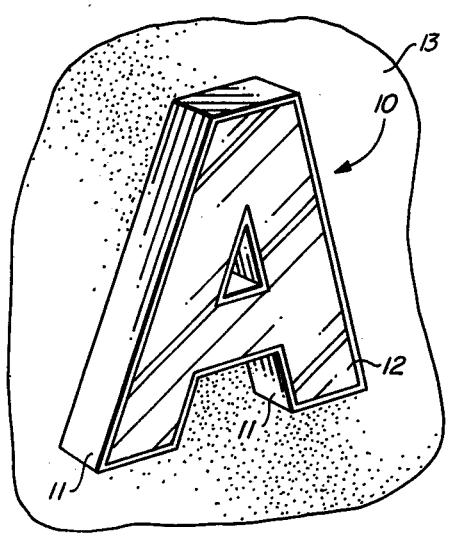
FIG-1
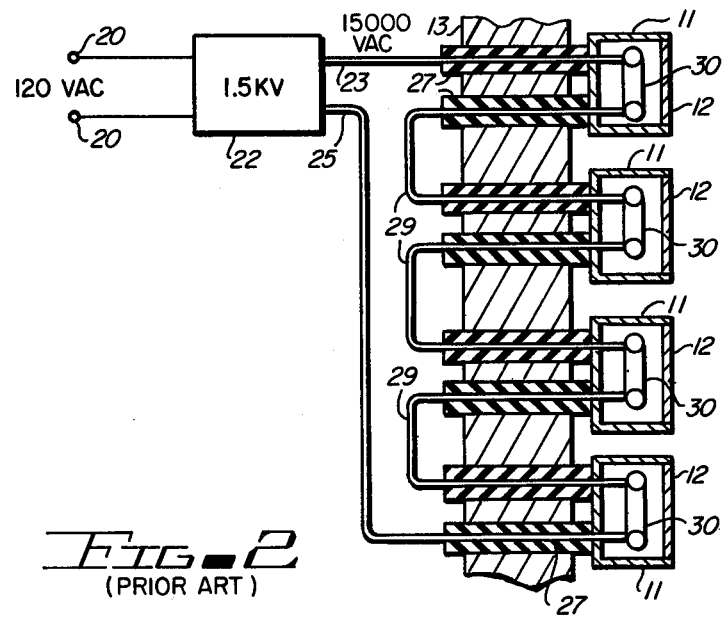
FIG-2 (PRIOR ART)
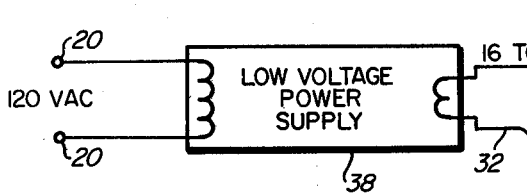
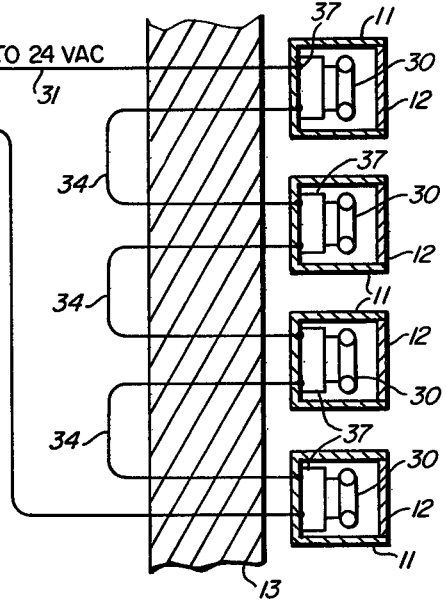
FIG-3
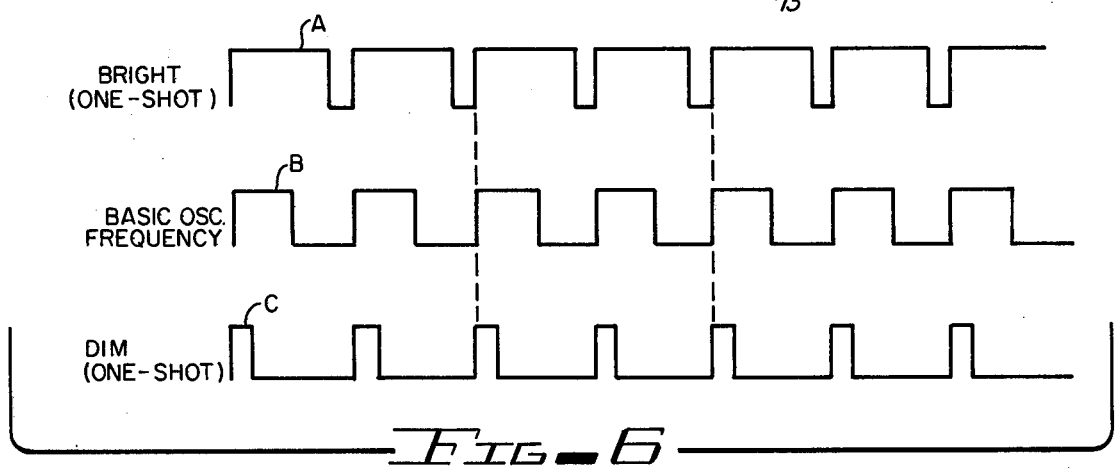
FIG-6

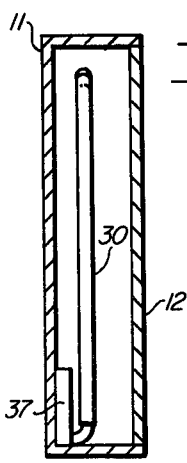
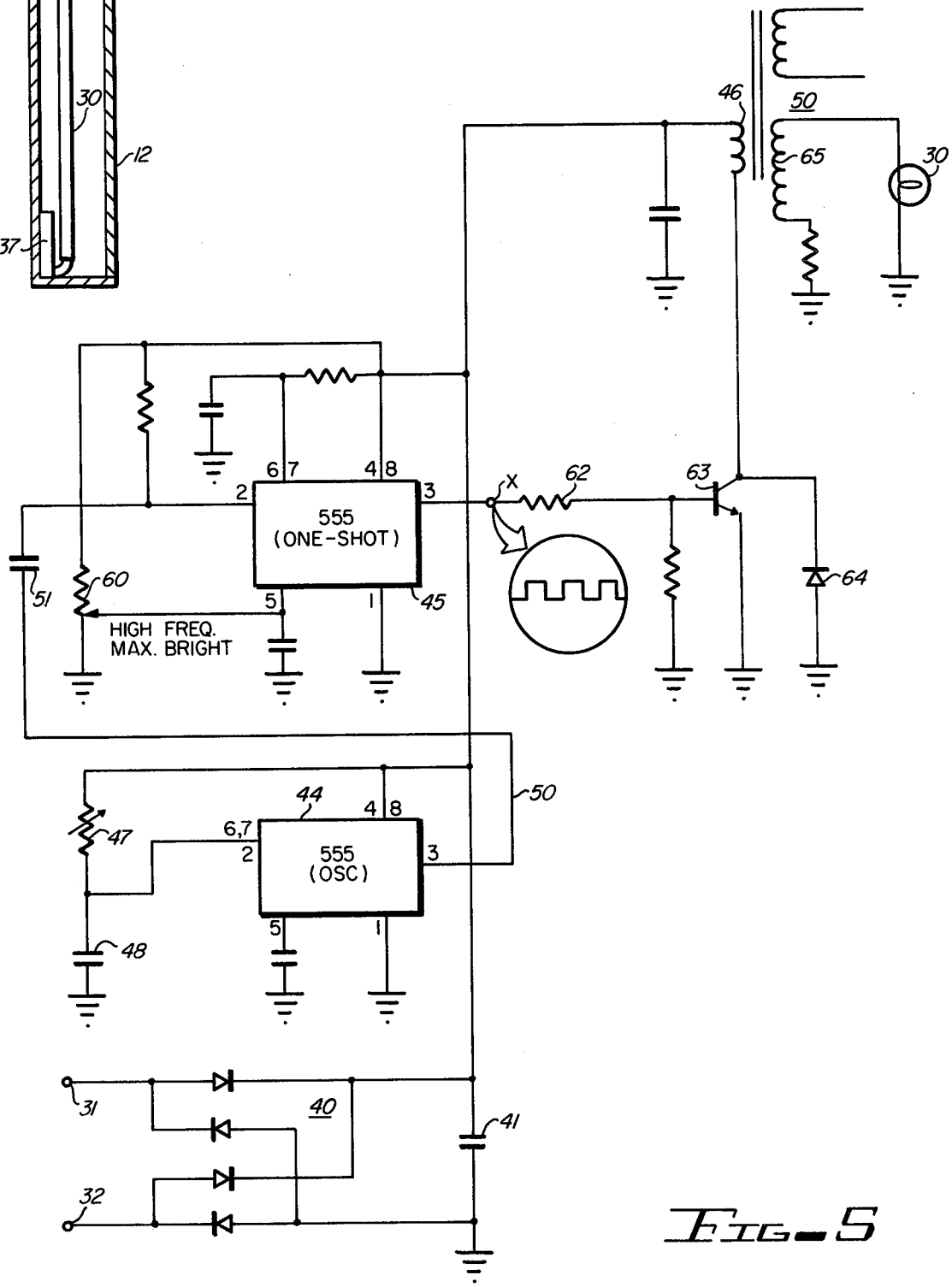

ADVERTISING SIGN SYSTEM

Illuminated advertising signs using high-voltage neon light tubes or the like are used in a wide variety of applications. Typically, these signs comprise light tube housings in the shapes of various letters, logos, or the like. The housings usually comprise a shallow, open-faced metal box in which the light tube and the power supply connections are attached. The open face of this box is then covered over with a translucent plastic material which usually is selected to be of a suitable color in accordance with the desires of the establishment on which the sign is to be used. This permits the sign to be observed both when it is illuminated for nighttime viewing and when it is non-illuminated (as is often the case) for daytime viewing.

The neon tubes which typically are used as the light producing element in these signs require a relatively high operating voltage in the range of 1,000 to 20,000 volts of alternating current. These signs normally are used on buildings or in areas where such high-voltage current is not directly available. Usually the power supply is conventional household current of 110 to 120 volts, 60 Hz alternating current, and high-voltage step-up transformers are used to convert this household current to the necessary high-voltage current supply for the light tubes.

A typical installation used in the prior art for these high-voltage illuminating signs is generally to provide a number of individual letters or symbols which then are attached to the outside wall of the building where the sign display is to be located. To convert the 110 volt to 120 volt 60 Hz household current to the necessary high operating high voltage at the same frequency, a relatively bulky, heavy step-up transformer is typically utilized. Because of the large size and weight of this transformer, it usually is located on the inside of the building in a location relatively near the point at which the sign is to be located. Then, high-voltage leads (carrying between 1,000 and 20,000 volts AC at 60 Hz) must be connected through the wall of the building to the various letters or components of the sign. To provide the necessary safety for passing such a high-voltage through the building wall, a relatively large diameter hole must be drilled through the building wall (typically between 1" and 1½" in diameter) to permit the placement of an insulating sleeve through which a heavy-duty metal-flex cable, capable of carrying the high-voltage, passes from the transformer to the individual sign letters. These sleeves typically constitute a hollow, cylindrical, ceramic material inside a cylindrical metal casing. The sleeves and metal-flex cable are bulky and expensive.

To permit flush mounting of the letters on the building, each different letter or symbol requires at least two of these large diameter holes to be drilled through the building wall at or adjacent the point where the connections for the high-voltage light tube in the letter are to be made to the high-voltage supply. Typically, the high-voltage supply is a series supply from the transformer with the cable passing through the insulating sleeves in the building wall from one letter or symbol to the next, with the first and last letters of the series being connected to different ones of the output conductors from the high-voltage transformer.

Because of the use of the high-voltage feed through the building wall, special precautions must be taken to insure the use of water-tight connections with the high-voltage cable and the lamps and further to prevent any water seepage through the insulating sleeves, since there is an extreme danger of fire hazard from a short circuit or the like caused by rain or other factors. Similarly, there is an extreme danger to persons working around the lamps from high-voltage shock potential, and only skilled labor can be used to effect replacement or repairs of components of the signs.

Another disadvantage of the typical prior art systems outlined above is that, whenever a sign is to be changed (such as when the premises is vacated by one business and occupied by a different one) or whenever a modification of the sign is to be made, the large, ugly holes drilled into the building for the first sign must be filled up and concealed. These holes also substantially weaken the structural integrity of the wall in which they are placed, particularly if a large number of letters or symbols are used or if the signs are changed several times over the life of the building.

Various persons have recognized the significant disadvantages of the system installations discussed above and have attempted to overcome these disadvantages by supplying the household operating current through the building wall directly to the letters or sign components and locating a step-up transformer adjacent to or within the letter housings themselves. Four such approaches are disclosed in the Patents to Cadieux, No. 1,804,525; O'Neill, No. 3,550,298; Mutzhas, No. 3,919,798; and Noellert, No. 3,965,597. The placement of high-voltage step-up transformers within or adjacent the individual letter housings creates additional problems. If a transformer is used within each individual letter, the large size and heavy weight of such a transformer somehow must be compensated for in the sign construction. In Cadieux, it results in a very deep box or housing for the fixture in order to accommodate the large, heavy transformer and its connectors behind the high-voltage light bulb. Because of the use of such a heavy transformer, it also is necessary to provide mounting brackets of substantial strength to attach the sign to the building. Each of the other three patents of this group also employ a relatively large and bulky transformer within the housing. As noted in the O'Neill Patent, particularly, this tends to create an objectionable dark area adjacent the place where the neon tube terminal connections are made with the transformer located in the housing. In O'Neill, an effort is made to overcome this by pivotally mounting the transformer within the housing and providing connections for the neon tube in the end of the transformer in a manner to eliminate dark spots. The Mutzhas Patent only discloses the interconnections between the transformer and the light tube in a diagrammatic manner. The emphasis in Mutzhas is the interconnection of the individual letters of a multiple element sign with mounting rails carrying operating current for each of the letters.

As is apparent from an examination of all four of the patents mentioned above, a relatively large, bulky transformer must be accommodated either within or adjacent the individual sign element or letter. The weight and bulk of such a transformer is significant and comprises a substantial disadvantage to this location of an individual transformer within each letter. In addition, the cost of large, high-voltage, step-up transformers is significant and, when individual transformers are employed for each of the letters of a sign, the finished cost of the display often becomes prohibitive. Furthermore, it still is necessary to feed 110 to 120 volt, 60 Hz AC current through the front wall of the building. While this is not as difficult to do and does not require the expensive feed-through insulating tubes mentioned above where the high-voltage is fed through the building wall, nevertheless, it still is necessary to drill a relatively large hole (on the order of ¼" diameter) and to provide for a water-proofing and insulation of the connector to minimize the hazards from a short circuit or sparkover from various causes, particularly whenever rain or moisture is present at the interconnection of the power supply with the letters of the sign.

Other applications requiring a high-voltage power source or lighting are found in outdoor lighting in the form of street lamps employing high intensity, luminous, discharge lamps. Such lamps require a relatively high feeding voltage of the order of several thousand volts. When the transformers for these lamps are located at a central location or in the base of the lamps, a very high voltage must be passed through the post on which the lamp is mounted. Since the posts frequently are located in places where they may be driven into by vehicles, a significant safety hazard exists in the event a vehicle should strike a pole or break it or knock it down. The persons in the vicinity of such a knocked down pole are subjected to the substantial hazards of the extremely high voltage present. An awareness of this problem is recognized in Pat. No. 3,862,411, and the system used there employs a step-down transformer located below ground to first step down the high voltage from the supply mains. This resulting low voltage then is supplied to a second transformer located in the lamp housing at the top of the pole where the voltage is stepped up to the voltage required by the lamp. The voltage between the two transformers is a physiologically harmless voltage. Because of the relatively large size of the lamp housings typically used in such street lamp installations, the bulk and weight of the high-voltage step-up transformer is not generally a problem. In addition, the heavy structural rigidity of light poles used for street lamps is readily capable of supporting the weight of the low-frequency step-up transformer at its location in or adjacent the lamp housing at the top of the pole.

It is desirable to provide an advertising sign system which overcomes the disadvantages of the systems described above. It is further desirable to provide an advertising sign system which particularly minimizes the hazards to persons working with a high-voltage sign system and minimizes the potential fire hazards commonly associated with such systems while at the same time providing a system which eliminates the large bulk and expense associated with prior art systems which place a high-voltage transformer within or adjacent each of the individual elements or letters of a high-voltage sign system.

SUMMARY OF THE INVENTION

Accordingly, it is an object of this invention to provide an improved advertising sign system.

It is another object of this invention to provide an improved advertising sign system using low-voltage supply to the sign housing elements.

It is an additional object of this invention to provide an improved economical advertising sign system which minimizes installation costs and safety fire hazards normally associated with such systems.

It is a further object of this invention to provide an advertising sign system employing high-voltage light tubes and supplied with low-voltage operating power in which the voltage conversion is efficiently effected by a relatively small converter located within the housing for the high-voltage light tube.

In accordance with the preferred embodiment of this invention, a low-voltage system is employed for operating a high-voltage light tube in an advertising sign in which the light tube is mounted in an advertising sign housing. A source of household alternating current located outside the sign housing is coupled to a device for producing a low-voltage output signal. This low-voltage signal then is supplied to the housing which has a low-voltage to high-voltage conversion system located in it. This conversion system produces a high-frequency, high-voltage operating current to the high-voltage light tube for effecting its operation.

In a more specific embodiment, the source of alternating current is located within the building on which the sign housing is mounted as is the device for producing the low-voltage output. The low-voltage output signals then are supplied through connectors passing through the wall of the building to the sign housings attached on the outside of the building. Individual connections are made with these low-voltage connectors in each of the sign housings to the low-voltage to high-voltage and high-frequency conversion system located within the housing.

BRIEF DESCRIPTION OF THE DRAWINGS

FIG. 1 is a perspective view of a typical assembled sign letter housing of the type with which the preferred embodiment of this invention is employed;

FIG. 2 is a diagrammatic cross-sectional representation of a commonly used prior art system for illuminating a sign letter of the type shown in FIG. 1;

FIG. 3 is a diagrammatic cross-sectional representation of a system made in accordance with the preferred embodiment of this invention;

FIG. 4 is a cross-sectional representation of a typical arrangement of parts of the assembly of FIG. 1 in accordance with the preferred embodiment of this invention;

FIG. 5 is a circuit diagram of a portion of the system shown in FIG. 2; and

FIG. 6 illustrates waveforms useful in understanding the operation of the circuit shown in FIG. 5.

DETAILED DESCRIPTION

Referring now to the drawings, the same reference numbers are used throughout the different figures to designate the same or similar components.

FIG. 1 illustrates a typical illuminated sign element in the form of a capital letter "A" 10 attached to the outer wall 13 of a building on which the sign element 10 is displayed. A typical construction for the sign element 10 is in the form of a relatively shallow, open-faced box having a metal back or base and sides 11. This box is made in the outline or configuration of the letter or sign element to be displayed. The face of the box then is covered with a translucent plastic sheet 12, also cut in the shape of the open face of the box 11. A high intensity neon or fluorescent light tube is then placed within the box 11 and has a configuration to evenly illuminate the translucent covering 12. The result is a pleasant, highly visible illuminated sign, the colors of which are established by the color of the translucent plate 12 and/or are produced by the neon light tube.

Because the neon light tubes require a high voltage for operation (1,000 volts to 20,000 volts or more), the typical installation illustrated in diagrammatic form in FIG. 2 is commonly employed. Here, the 110 to 120 volt, 60 Hz alternating current, available within most buildings where such signs are to be used, is applied in a conventional fashion to a pair of input terminals 20. A relatively large, heavy and expensive low-voltage to high-voltage transformer 22 is supplied with this operating current on its input terminals and produces a high-voltage, 60 Hz alternating current on a pair of output terminals 23 and 25. As indicated in FIG. 2, the step-up voltage is shown as 1,500 volts but, depending upon the characteristics of the neon light tubes used in the lighting fixtures, this voltage can be even higher (15,000 volts for example). It is evident that this high voltage requires heavy-duty conductors 23 and 25 and special handling in its use and installation. Because of the high voltages involved, the conductors 23 and 25 generally are of heavy-duty metal-flex cable. In addition, to supply this high-voltage current through the wall 13 of the building, relatively large holes on the order of 1" to 1½" must be drilled through the building wall. A minimum of two holes must be drilled for each light tube located within a sign housing 10. Then, what is known as a "P.K." housing sleeve 27 is inserted into each of these holes. These housing sleeves comprise essentially a hollow, cylindrical, metal outer casing surrounding a hollow, cylindrical, ceramic or glass insulator through which the cables 23 and 25 pass.

As illustrated in FIG. 2, the interconnections between the conductors 23 and 25 and a typical set (shown to be 4) of sign housings is a series connection. To minimize unsightly visible wiring, the high-voltage interconnections from one lamp housing to the next are effected inside the building by means of connecting cable loops 29 going from the output side of the high-voltage neon light tube 30 of one letter or element of the sign to the input side of the next, and so forth, with the final return from the last (illustrated as the lowest one in FIG. 2) of the sign elements back through the cable 25 to the transformer 22.

As is evident from an examination of the prior art structure of FIG. 2, a large number of relatively large holes must be drilled into the building wall 13. In addition, each of the insulating sleeves or housings 27 are expensive to purchase and install. Furthermore, extreme care must be taken to be sure that the connections with the lamp terminals extending through the back of the individual sign letter housings 10 are secure and waterproofed to prevent dangerous flashover or sparking between the high-voltage terminals in the presence of moisture. Consequently, skilled installers familiar with working with high-voltage electricity must be used to insure safe and proper installation of the various sign letter housing elements 10 in a typical multi-element installation. Because of the significant high-voltage step-up effected by the transformer 22, it is a large, heavy and expensive piece of equipment.

In constrast with the typical prior art installation illustrated in FIG. 2, FIG. 3 shows a similar installation employing the principals of this invention. Household operating current, in the form of the above-described 110 to 120 volt, 60 Hz alternating current, is applied to the terminals 20, as in the case of the system shown in FIG. 2. This current, however, then is supplied to a low-voltage power supply which typically may be a simple and relatively inexpensive step-down transformer 38 as illustrated diagrammatically in FIG. 3. The output of the transformer 38 is applied on a pair of output leads 31 and 32, and typically is in the range of 16 to 24 volts alternating current at the 60 Hz frequency of the supply to the input of the transformer. This extremely low voltage presents no harmful shock hazard to humans and essentially eliminates any fire hazards which might result from a short circuit. In addition, the wires used for the leads 31 and 32 may be very small, typically of the type of wire used for doorbell wires and telephone installations. No high-voltage insulators are necessary for passing these wires through the wall 13 of the building. In fact, no insulators whatsoever are required. Thus, minimum size holes need to be drilled in the wall 13 of the building and, as shown in FIG. 3, this is simply illustrated by drawing the wires 31 and 32 as simply passing directly through the wall 13. 0bviously, a small hole does need to be formed, but the diameter of this hole is several orders or magnitude less than the diameter of the holes necessary to install the insulating sleeves 27 in the version shown in FIG. 2.

In place of connecting the conductors 31 and 32 to sockets for directly supplying operating current to the high-voltage light tubes 30, however, the leads 31 and 32 (and interconnecting series loop leads 34) are connected to the input terminals of low-voltage to high-voltage conversion circuits located within small housings 37 mounted on the back wall of each of the individual sign housing elements used in conjunction with a particular display. This low-voltage to high-voltage conversion system located within the different housings 37 is shown in detail in FIG. 5 and comprises a solid state electronic circuit and a step-up transformer for producing the desired high voltage needed to operate the light tubes 30. Because of the solid state nature of the circuitry and the use of high frequency (10,000 to 30,000 Hz), the space required for this conversion circuit, and therefore the space required by the housings 37, is quite small. Typically, the overall dimensions of a finished module 37 for effecting this conversion is 3"×3"×1" for the driver for a relatively short neon tube 30 to approximately 5"×2"×1½" for the driver used for a relatively long neon tube. The high frequency also permits the use of a relatively small and lightweight voltage step-up transformer so that the weight of the electrical components placed within each of the boxes 37 is minimal.

FIG. 4 shows a cross-sectional side view of a typical lamp housing 10 showing the three-sided open box 11 covered by the translucent plastic sheet 12 and further illustrates the arrangement of a high-voltage neon light tube 30 and the low-voltage to high-voltage conversion circuit housing 37. Although a location for the housing 37 is shown in FIG. 4 as being near the bottom of the sign housing case 11 at a junction of one of the side walls with the back, the particular location of the housing 37 for the conversion circuit may be anywhere within the overall advertising sign housing 11. Because of the shallow depth of the housing 37, substantial design flexibility is available to sign installers for the location of these circuit components, and the housing 37 may be placed anywhere within the housing 11 which is convenient for connecting the high-voltage light tube 30.

Because the supply leads 31, 32, and 34 which pass through the housing 11 to supply operating current to the circuitry located within the converter housing 37 carry only very low-voltage, low-frequency current, they simply may be passed through a small hole conveniently located anywhere in the back or side walls of the open-sided housing 11 through a rubber grommet or other suitable simple waterproofing device or compound.

Reference now should be made to FIG. 5 which illustrates a typical, low-voltage to high-voltage conversion circuit housed within the converter housing 37 discussed above. The input terminals to the circuit shown in FIG. 5 are connected to the low-voltage leads 31 and 32 through any suitable connector. These are connected directly to the leads 31 or 32 or by way of the bridging interconnectors 34 shown in FIG. 3. A series interconnection of the type shown in FIG. 3 may be employed or, if desired, depending upon the requirements of the installation, the leads 31 and 32 may be connected in parallel to two or more individual elements of an advertising sign arrangement used in a typical installation. This depends upon the requirements and characteristics of the particular installation.

In any event, the low-voltage power supplied to the conversion unit located within the housing 37 is first supplied to a full-Wave rectifier 40 to produce a low-voltage direct current power supply for operation of the low-to-high voltage conversion circuit. This voltage is developed across a ripple or filter capacitor 41 and is supplied as direct current operating power to a high-frequency oscillator 44, a one-shot multivibrator 45, and the primary winding 46 of a low-voltage to high-voltage step-up transformer 50.

The oscillator 44 and the one-shot multivibrator 45 are conventional, solid state timer circuits such as the LM555 manufactured by National Semiconductor. The external connections to these functional timer block circuits determine whether they operate as a one-shot multivibrator or as an oscillator. For the oscillator 44, an external resistor 47 and capacitor 48 are interconnected across the designated terminals to determine the frequency of operation. The resistor 47 is shown as a variable resistor to permit setting of the frequency of oscillation of the oscillator circuit 44 from 10,000 to 30,000 Hz. Once an operating frequency has been established, no further adjustments of the resistor 47 are made. The signal produced by the oscillator 44 is a square-wave signal illustrated in waveform B of FIG. 6. With the external interconnections of the resistors 47 and 48 and the other components shown in FIG. 5 for the LM555, the oscillator 44 operates as a fifty percent duty cycle oscillator. This is illustrated clearly in waveform B in FIG. 6.

The output terminal of the oscillator 44 is connected by means of a lead 49 to the input terminal of the one-shot multivibrator 45 through a coupling capacitor 51. As mentioned above, the basic functional timer block used for the circuit 45 is configured by the external connections to operate as a one-shot multivibrator. More specifically, this circuit is connected to operate as a pulse width modulator triggered by the square-wave signal applied to it over the lead 49 from the oscillator 44. The desired duty cycle or width modulation is effected by a variable potential obtained from a voltage divider resistor 60 connected across the direct current power supply provided by the rectifier 40. As the tap on the voltage divider resistor 60 is varied, a control potential is applied to the control input terminal or modulation input terminal of the timer block for the one-shot multivibrator 45 to vary the duty cycle of the output signal supplied at an output terminal X to a coupling resistor 62. This signal, in turn, is supplied to the base of a power NPN switching transistor 63 connected in series between the lower side of the primary winding 46 and ground. When the transistor 63 is switched on by the signal applied to it from the output of the one-shot multivibrator 45, current flows through the primary winding 46 of the transformer 50 from the rectifier power supply 40. When the transistor 63 is turned off, the collapsing flex in the transformer 50 causes current to flow through a reverse connected diode 64 and the winding 46 thereby producing the desired alternating current input through the winding 46.

As illustrated in FIG. 6, when the transistor 63 is turned on for a greater proportion of the total duty cycle from the output signal of the oscillator 44, a waveform comparable to that of waveform A in FIG. 6 is applied to the base of the transistor 63. This produces a maximum current flow through the high-voltage neon light tube 30 connected to the secondary winding 65 of the transformer 50. On the other hand, when a setting of the potentiometer 60 is made to create a minimum duty cycle signal such as shown in waveform C of FIG. 6, a lesser amount of operating current is supplied to the neon tube 30, thereby causing the output of the tube 30 to be dim as compared to its output when a signal such as shown in waveform A is applied to it. As a consequence, a fine tuning adjustment of the balance of the light emanating from different letters or elements of a multi-element sign may be effected by adjustments of the potentiometer 60 used in each of the individual letters or elements.

All of the components shown in FIG. 5, with the exception of the high-voltage neon light tube 30, are located within the housing 37 in each of the individual sign letters or elements. For further protection and safety, the elements of FIG. 5 all may be potted in epoxy, if desired, leaving only an external access to the potentiometer 60.

Since the oscillator 44 and the one-shot multivibrator 45 are solid state components, they are quite small, and these circuit components along with the external resistors and capacitors shown in FIG. 5 all can be mounted on a compact circuit board having dimensions which easily permit it to be mounted inside housings 37 having the dimensions described above. Because the oscillator 44 produces a very high-frequency output (as mentioned, 10,000 to 30,000 Hz), this high-frequency signal applied to the base of the power switching transistor 63 results in a comparable high-frequency signal applied to the primary winding 46 of the transformer 50. As is well known, the step-up of voltage from a low voltage to a high voltage by means of a transformer at high frequencies may be effected with far less iron and bulk than is necessary for accomplishing a comparable voltage step-up at low frequencies (such as the typical household 60 Hz frequency). Consequently, the transformer 50 is a relatively small, lightweight compact transformer.

It should be noted that, although the switching of operating current to the primary winding 46 of the transformer 50 is illustrated as being accomplished by means of a power transistor 63, this switching also could be effected by means of a triac instead of the transistor 63. The operation of the system is the same as described above with only modifications readily apparent to those skilled in the art needed to effect such a change from a transistor to a triac as a switching element.

Since the back and sides 11 of a typical letter or sign element usually are made of metal, the power transistor 63 preferably is attached directly to this portion of the sign element which then also serves as a heat sink for the transistor 63. However, any well known heat sinks of various types may be employed to dissipate the heat generated in the transistor 63 during the operation of the system.

From the foregoing, it is seen that the system which has been described in conjunction with FIGS. 3 through 6 is a highly efficient, hazard-free, versatile system overcoming the various problems associated with the prior art devices discussed above in the Background of the Invention section. Various changes and modifications will occur to those skilled in the art without departing from the scope of the invention. Consequently, the specific structure and circuit configuration which has been described in conjunction with the preferred embodiment of this invention is to be considered as illustrative only of the features of the invention.

I claim:

1. A low-voltage system for operating a high-voltage light tube in an advertising sign attached to the outer wall of a building including in combination;
    an advertising sign housing attached to the outside wall of a building and having a high-voltage light tube mounted therein;
    a source of household alternating current located within the building on which said advertising sign housing is mounted;
    first means located within the building and coupled to said source of household current for producing a low-voltage output;
    a low-voltage to high-voltage conversion means located within said housing and having an input and an output, said output connected to said high-voltage light tube for supplying high frequency, high-voltage operating current thereto; and
    means for interconnecting the output of said first means with the input of said low-voltage to high-voltage conversion means through the wall of the building.

2. The combination according to claim 1 wherein said first means is a step-down transformer means.

3. The combination according to claim 2 wherein said step-down transformer means provides an output voltage in the range of 16 to 24 volts at the frequency of said household alternating current.

4. The combination according to claim 3 wherein said source of household alternating current is a source of 110 to 120 volt 60 Hz current.

5. The combination according to claim 2 wherein said step-down transformer means produces an output voltage of 16 to 24 volts at 60 Hz, and said conversion means provides a high-frequency, high-voltage alternating current of approximately 1,000 volts at 20,000 volts at 10 kHz to 30 kHz.

6. The combination according to claim 5 wherein said low-voltage to high-voltage conversion means includes solid state oscillator means for producing said high-frequency operating signal and means for varying the dwell time of the output signal of said oscillator means for changing the brightness of said high-voltage light tube accordingly.

7. The combination according to claim 6 wherein said means for varying the dwell time includes a variable one-shot multivibrator, the input of which is connected to the output of said oscillator means and the output of which is coupled to the primary winding of a step-up transformer, the secondary winding of which is connected to said high-voltage light tube to supply operating current thereto.

8. The combination according to claim 1 wherein said low-voltage to high-voltage conversion means includes solid state oscillator means for producing said high-frequency operating signal and means for varying the dwell time of the output signal of said oscillator means for changing the brightness of said high-voltage light tube accordingly.

9. The combination according to claim 8 wherein said means for varying the dwell time includes a variable one-shot multivibrator, the input of which is connected to the output of said oscillator means and the output of which is coupled to the primary winding of a step-up transformer, the secondary winding of which is connected to said high-voltage light tube to supply operating current thereto.

10. A low-voltage system for operating high-voltage light tubes in an advertising sign, including in combination:
    an advertising sign housing having a high-voltage light tube mounted therein;
    a source of household alternating current located outside said advertising sign housing;
    a step-down transformer means located outside said advertising sign housing and coupled to said source of household current for producing an alternating current signal at the frequency of said source of household alternating current and at a voltage of between 16 and 24 volts;
    rectifier means located within said housing having an input connected to receive the signal from said step-down transformer means and having an output;
    solid state oscillator means located within said housing for producing alternating current output signals in a frequency range from 10,000 Hz to 30,000 Hz;
    a step-up transformer means within said housing and having a primary winding and a secondary winding;
    means for connecting the output of said solid state oscillator means to the primary winding of said step-up transformer means;
    means for connecting the secondary of said step-up transformer means to said high-voltage light tube for supplying operating current thereto;and
    said rectifier means supplying operating power to said oscillator means and to the primary winding of said step-up transformer means.

11. The combination according to claim 10 further including a solid state power switch connected in series with said primary winding of said step-up transformer and said oscillator means produces an output signal to drive said power switch on and off with a high-frequency square-wave signal.

12. The combination according to claim 11 wherein said low-voltage to high-voltage conversion means further includes a one-shot multivibrator, the input of which is connected to the output of said oscillator and the output of which is connected to drive said power switch and further including means for varying the duration of the output pulse from said one-shot multivibrator to thereby vary the dwell time of the signal applied to said power switch.

13. The combination according to claim 11 further including means for varying the dwell time of the signal used to drive said power switch to thereby vary the current supplied by the secondary winding of said step-up transformer to said high-voltage light tube to vary the intensity thereof.

* * * * *